United States Patent Office 3,277,287
Patented Oct. 4, 1966

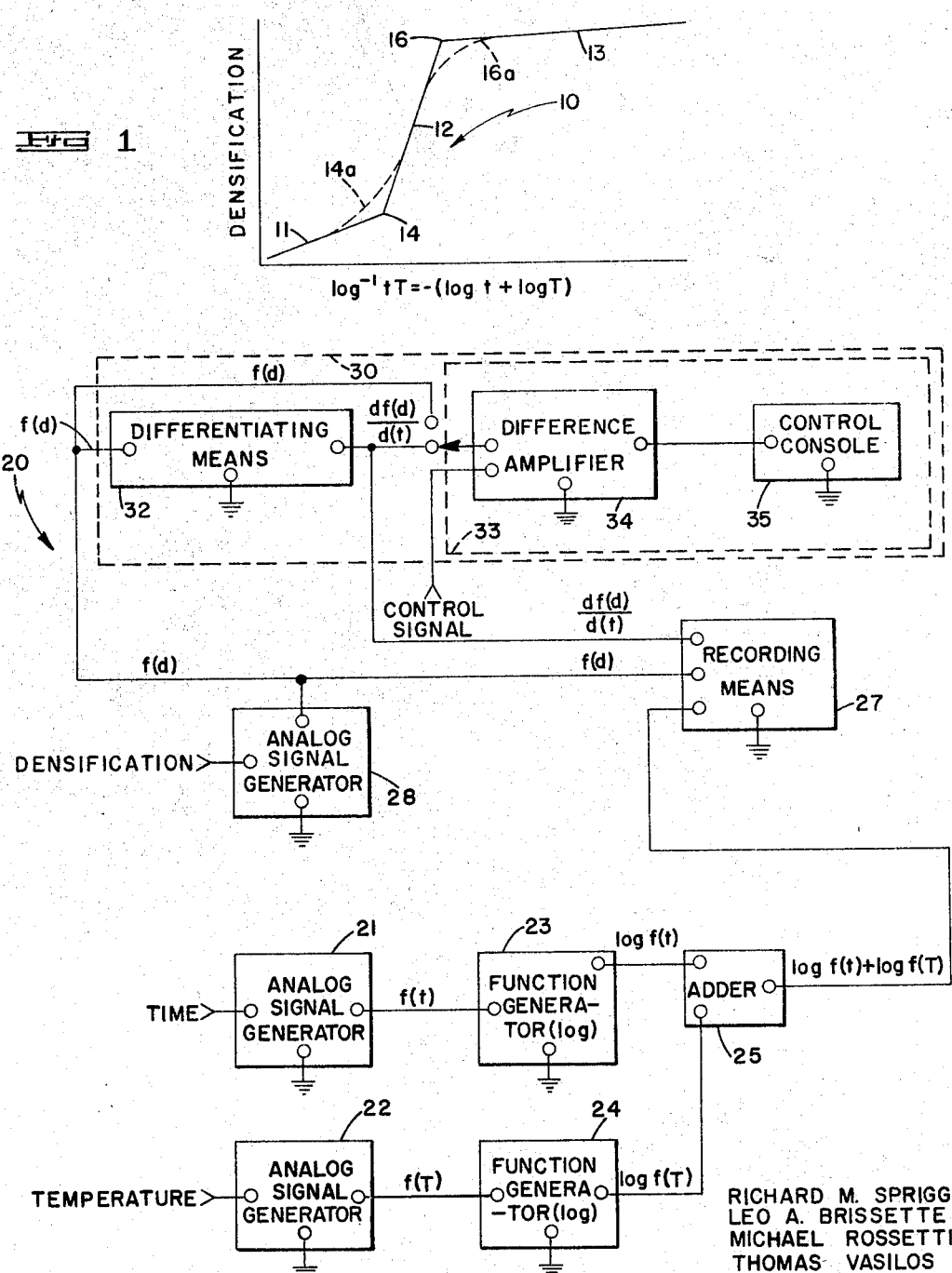

3,277,287
METHOD OF MONITORING PRESSURE SINTERING PROCEDURES
Richard M. Spriggs, Reading, Leo A. Brissette, Greenwood, Michael Rossetti, East Boston, and Thomas Vasilos, Winthrop, Mass., assignors to Avco Corporation, Cincinnati, Ohio, a corporation of Delaware
Filed Aug. 9, 1962, Ser. No. 215,986
8 Claims. (Cl. 235—151.3)

This invention relates to pressure sintering fabricating processes and, in particular, to methods of monitoring and controlling pressure sintering densification processes.

Pressure sintering is defined as a process wherein a material undergoes densification or consolidation by the simultaneous application of high pressure at relatively low temperatures; it is a form of hot pressing. A discussion of pressure sintering processes and techniques is embodied in a copending application entitled, "Ultrahigh Density Polycrystalline Material and Method of Making Same," Serial No. 215,965 filed simultaneously with this application and assigned to the same assignee as this invention.

Heretofore, there was no known method of continuously monitoring the compression of a material in a pressure sintering procedure. Only postfabrication analyses were available, and these were limited to data obtained from isothermal runs only. Thus, in situ, monitoring of structures of materials in the process of consolidation or densification did not exist. Close control of properties was not possible and, hence, full use of the many potentionally unique properties of the materials could not be realized.

The present invention is particularly useful in forming ultrahigh density polycrystalline ceramics, and the ensuing discussion tending to illustrate the invention will be limited to methods of monitoring pressure sintering processes for forming these materials.

It is an object of the invention to provide a method of monitoring a pressure sintering densification procedure.

It is another object of the invention to provide a monitoring method which provides a positive indication of the time during a pressure sintering procedure when a material has been converted into an ultrahigh density polycrystalline form.

It is yet another object of the invention to provide a method of using pressure sintering process parameters such as time, temperature, pressure and compression to provide a graphical chart of a pressure sintering densification procedure.

Other objects of the invention are to provide methods of monitoring pressure sintering procedures whereby: (1) the rate of change of compression is used as a monitoring parameter and (2) a graphical representation of the progress of a pressure sintering operation is presented.

Still other objects of the invention are to provide a method of:

(1) Monitoring and controlling pressure sintering procedures, (2) Utilizing the rate of change of densification to control a pressure sintering procedure and (3) Terminating a pressure sintering procedure at a predetermined time.

In accordance with the invention, a method of monitoring a pressure sintering densification process of a material comprises: (1) generating a first electrical signal representing the log of the inverse product of time and temperature, (2) generating a second electrical signal representing the densification of said material and (3) applying said first and second electrical signals to a graphical recorder for generating a graphical representation of one of said electrical signals as a function of the other.

In accordance with another aspect of the invention, a method of monitoring and controlling a pressure sintering densification process of a material comprises: (1) generating electrical analog signal of the densification of said material, (2) differentiating said analog signal to provide a second signal representing the rate of change of densification of said material and (3) terminating the pressure sintering procedure when said rate of change approaches a constant minimum value.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings in which:

FIGURE 1 is a curve useful in understanding the invention; and

FIGURE 2 is a schematic representation of a monitoring and control system for carrying out the invention.

Referring to FIGURE 1 of the drawings, there is represented therein a semilogarithmic curve of densification as a function of the inverse product of time and temperature. The inverse product of time and temperature is plotted on a logarithmic scale.

As shown in FIGURE 1, the curve 10 comprises three straight lines 11, 12 and 13, respectively, with three different slopes and two intersections or "knees" 14 and 16. The slopes and relative positions of the three curves are determined by the type of material, its particle size, distribution and the heating rate. In addition, curve 10 is pressure dependent; i.e., curve 10 was generated under different constant pressure conditions. The shape of curve 10 would be changed if generated under different constant pressure conditions.

The three distinct lines 11, 12 and 13 and their slopes represent three stages of densification or consolidation of a material undergoing a pressure sintering procedure. It is not known precisely what occurs within the material, but the three stages of densification depicted by lines 11, 12 and 13 are believed to be as follows:

Stage 1 (line 11) is essentially mechanical compaction of the material and probably includes a combination of particle rearrangement, sliding, particle fragmentation and perhaps some plastic flow and/or diffusional processes.

Stage 2 (line 12) is believed to be further densification of the material by removal of open-type pores or voids and probably proceeds via some type of material transport processes such as a plastic flow mechanism of deformation or bulk diffusion.

Stage 3 (line 13) is finally densification of the material where the remaining pores or voids (probably of the closed-type) are eliminated. This stage may be almost entirely diffusion controlled. Densification during the third stage is essentially complete when the curve asymptotically approaches a saturation or limiting density which for many materials appears to be 95 percent or higher of the theoretical density. Normally the fabricating temperatures and pressures are sufficient for the material to reach about 95 percent density at the conclusion of stage 2 where the second knee 16 in the curve occurs.

Grain growth commences during stage 2 and continues to occur into stage 3.

The curve illustrated in FIGURE 1 was derived from densification data on electronic-grade magnesium oxide at 1150° C. and 10,000 p.s.i. Added densification occurred when the pressure was increased to 20,000 p.s.i. after the third stage commenced.

Curves of densification as a function of the inverse logarithm of the time-temperature product have been generated for other ceramic materials, such as nickel oxide, alumina and tantalum carbide. These curves were similar to the curve illustrated in FIGURE 1, each exhibiting the three transitional stages. In general, however, the curves were of a "lazy S" configuration. Instead of the abrupt transition between stages such as were described and shown in connection with FIGURE 1 at the knees 14 and 16, the transition from stage to stage was more gradual. A rounded knee configuration was observed as indicated by the dotted lines 14a and 16a.

The important points are that: (1) the pressure sintering procedure can be continuously monitored, (2) the densification curve as a function of time and temperature can be generated for each material, (3) equations can be fitted into the curves regardless of actual shape and (4) these equations can be used in monitoring and process control. The last point is particularly significant.

Referring to FIGURE 2, there is depicted therein a preferred monitoring and control system for graphically displaying the FIGURE 1 curve. The FIGURE 2 embodiment is preferred because of its simplicity. It makes use of the well-known mathematical relationship of $$\log T^{-1}t^{-1} = -\log T - \log t = -(\log T + \log t) \quad (1)$$

where

T is temperature in degree centigrade, and
t is time in seconds.

The monitoring and control system depicted in FIGURE 2, generally designated 20, includes a pair of analog signal generators 21 and 22 for providing an electrical analog signal of the time, $f(t)$, and temperature $f(T)$, variables, respectively. The inputs to analog signal generators 21 and 22 are derived from sensors, such as thermocouples and clock devices.

The analog signal generators 21 and 22 may be no more complex than potentiometer circuits which provide a unidirectional (D.C.) signal, the amplitude of which is proportional to time or temperature. Each analog signal generator 21 and 22 is coupled to a function generator 23 and 24, respectively, wherein the log of the analog signal is developed. Functional generators 23 and 24 may take any one of the widely known forms commonly used in analog computer systems.

The output of the function generators 23 and 24 representing the log, $f(t)$, and log, $f(T)$, respectively, are coupled to an adder circuit 25 for producing an output signal representing the sum of the aforementioned log signals, viz, $\log f(t) + \log f(T)$.

The output sum signal is coupled to a recording means 27, preferably a graphical recording means such as a strip chart recorder as one coordinate, preferably the abscissa.

The ordinate of the curve is formed by generating an analog signal representing the degree of densification or compaction of the material undergoing a pressure sintering procedure. Inherently, a pressure sintering densification or compaction procedure is accompanied by the movement of the compressing plungers as described in the referenced copending application. The plunger movement and the degree of densification are related.

The most convenient method of obtaining the aforementioned analog signal is through the use of a linear variable differential transformer (LVDT). The output signal of the LVDT is proportional to the movement of a member to which it is attached, e.g., a plunger or a platen which actuates the plunger. An alternative arrangement is an electrical potentiometer mechanism actuated by a mechanical movement similar to a standard dial indicator. The voltage derived from the potentiometer would be a function of the movement of the actuator and, consequently, a funciton of the movement of a member performing the densification.

The densification analog signal is coupled from an analog signal generator 28, either directly or through an amplifier (not shown), to the recording means 27 and then recorded as an ordinate value.

It is quite obvious that the FIGURE 2 system or its equivalent will construct a curve similar to that shown in FIGURE 1 providing the densification pressure is kept constant.

Practitioners skilled in the art will recognize that the analog of the inverse product of temperature and time may also, by first obtaining the product of the analog signals of time and temperature and operating on the product, secure its inverse. The inverse may then be coupled to a function generator for securing the log thereof. All of the above may be accomplished in a simple and facile manner by means of widely known and well-developed analog computing circuits.

Referring once again to FIGURE 2 of the drawings, there is also depicted a control sub-system 30, the purpose of which is to terminate a pressure sintering densification fabrication run at a predetermined time. It will be recalled when densification occurs, the third stage (line 13) becomes asymptotic with respect to the theoretical density. It follows, therefore, that the rate of change in densification will approach zero and more precisely a small minimum value when the material undergoing pressure sintering approaches theoretical density.

In accordance with the invention, a control sub-system 30 is provided to terminate a fabrication run when densification occurs. In the manner described heretofore the analog signal generator 28, either an LVDT or potentiometer circuit, generates a signal which is a function of the densification or compactness of the material being compressed. The analog signal is coupled to a differentiating circuit 32 which differentiates the analog signal to provide a differential signal which is a function of the rate of change of the analog signal and, consequently, the rate of change of densification.

The differential signal may be coupled to a graphical recorder such as a strip recorder 27 for visually displaying the differential signal.

The differential signal may also be coupled to a control circuit 33 comprising a differential amplifier 34 where it is compared with a second input (control) signal. An output signal representing the difference of the differential signal and the control signal is coupled to a control console 35. The control console 35 is designed to terminate the pressure sintering procedure by relieving the applied pressure and cooling when the control signal applied to its input reaches or approaches zero. The design of control console 35 can be quite conventional.

Clearly, control during stage 2 (line 12) of the densification curve can be accomplished by comparing the analog signal, $f(d)$, with the control signal in the difference amplifier 34. This may be accomplished through a simple switching arrangement at the input of the difference amplifier 34.

It is quite clear from the foregoing that a family of straight line densification curves can be produced in the laboratory. The foregoing monitoring procedures when compared with the family of curves will allow one to closely control a material's density, porosity and grain size. This results in specifically tailored structures which yield desired mechanical, thermal, electrical and optical properties. The aforementioned control is obtained only as a result of the novel monitoring procedures illustrated above since heretofore only control by postfabrication analysis was available.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

We claim:
1. A method for monitoring a pressure sintering densification process of a material in which elapsed time and temperature of said material are available and pressure is kept constant, comprising:
   (a) measuring said elapsed time and generating a first signal proportional to the log of the magnitude of said elapsed time;
   (b) measuring said temperature and generating a second signal proportional to the log of the magnitude of said temperature;
   (c) using said first and second signals to generate a third signal proportional to the sum of the magnitudes of said first and second signals;
   (d) feeding said third signal to an input of a graphical recorder, causing said recorder to record a coordinate of a curve with a magnitude proportional to said third signal;
   (e) measuring said densification of said material and generating a fourth signal proportional to the magnitude of said densification; and
   (f) feeding said fourth signal to an input of said graphical recorder causing said recorder to record another coordinate of said curve with a magnitude proportional to said fourth signal.

2. In a method of monitoring a pressure sintering densification process of a material in which time and temperature are variable and pressure is kept constant, comprising:
   (a) measuring the elapsed time and temperature and generating a first signal proportional to the log of the inverse product of the magnitudes of said elapsed time and temperature;
   (b) measuring said densification of said material and generating a second signal proportional to the magnitude of said densification; and
   (c) feeding said first and second signals to a graphical recorder causing said recorder to record first and second coordinates of a curve where said coordinates have magnitudes proportional to said first and second signals, respectively.

3. A method of controlling a pressure sintering densification process of a material, comprising:
   (a) measuring said densification of said material and generating a first signal proportional to the magnitude of said densification;
   (b) differentiating said first signal with respect to time to obtain a differential signal; and
   (c) applying said differential signal to a control circuit for terminating said pressure sintering process when said differential signal reaches a predetermined value.

4. A method of controlling a pressure sintering densification process of a material as described in claim 3 in which said control circuit terminates the pressure sintering process when said differential signal reaches a substantially constant minimum value.

5. A method of monitoring and controlling a pressure sintering densification process of a material comprising the method of claim 3, and in addition feeding said differential signal to a graphical recorder causing said recorder to record the magnitude of the rate of change of said densification.

6. A method of controlling a pressure sintering densification process of materials where pressure, elapsed time, and temperature are parameters, comprising:
   (a) maintaining a constant pressure;
   (b) measuring elapsed time and temperature and developing a first electrical signal proportional to the log of the magnitude of the inverse product of elapsed time and temperature;
   (c) measuring said densification of said material and generating a second signal proportional to the magnitude of said densification of said material;
   (d) differentiating said electrical system with respect to time for obtaining a differential signal; and
   (e) feeding said differential signal to a control means to terminate said pressure sinetring process when said differential signal reaches a predetermined value.

7. A methad of controlling a pressure sintering densification process of materials where pressure, elapsed time, and temperature are parameters, comprising:
   (a) the control method described in claim 6, and in addition applying said first electrical signal to a graphical recorder to develop one coordinate of a first curve and of a second curve with a magnitude proportional to elapsed time;
   (b) feeding said second electrical signal to said graphical recorder as a second coordinate of said first curve with a magnitude proportional to densification of said material; and
   (c) applying said differential signal to said graphical recorder as the second coordinate of said second curve with a magnitude proportional to the rate of change of densification of the material.

8. A monitoring and control method as described in claim 7 which includes in addition feeding a control signal coupled to the control means and for terminating said pressure sintering process when said differential signal equals the value of said control signal.

References Cited by the Examiner

UNITED STATES PATENTS 2,983,859  5/1961  Coales _____ 235—151

OTHER REFERENCES

Pages 213, 308 and 310, 1952—Korn & Korn, Electronic Analog Computers, McGraw-Hill.

MALCOLM A. MORRISON, *Primary Examiner.*

K. W. DOBYNS, *Assistant Examiner.*